United States Patent [19]
Mason, Jr. et al.

[11] Patent Number: 6,112,257
[45] Date of Patent: Aug. 29, 2000

[54] DYNAMIC ADJUSTMENT OF MIRROR SERVICE POLICY FOR LOGICAL VOLUMES IN A DISK DRIVE SYSTEM BASED ON COLLECTED STATISTICS

[75] Inventors: Robert S. Mason, Jr., Mendon; Yuval Ofek, Framingham; Natan Vishlitzky, Brookline; Dan Arnon, Boston; Eitan Bachmat, Hopkinton, all of Mass.

[73] Assignee: EMC Corporation, Hopkinton, Mass.

[21] Appl. No.: 08/936,122

[22] Filed: Sep. 24, 1997

[51] Int. Cl.$^7$ ............................... G06F 3/00; G06F 13/00
[52] U.S. Cl. ............................... 710/18; 709/105; 711/114
[58] Field of Search ............................... 395/182.04, 838, 395/675; 711/112, 114; 502/324; 709/105, 223; 710/18; 714/6

[56] References Cited

U.S. PATENT DOCUMENTS

| | | | |
|---|---|---|---|
| 4,633,387 | 12/1986 | Hartung et al. | 364/200 |
| 5,283,897 | 2/1994 | Georgiadis et al. | 395/650 |
| 5,432,922 | 7/1995 | Polyzois et al. | 395/425 |
| 5,539,883 | 7/1996 | Allon et al. | 395/200.1 |
| 5,680,574 | 10/1997 | Yamamoto et al. | 395/464 |
| 5,708,769 | 1/1998 | Stallmo | 395/182.04 |
| 5,802,301 | 9/1998 | Dan et al. | 395/200.53 |
| 5,805,919 | 9/1998 | Anderson | 395/821 |
| 5,819,310 | 10/1998 | Vishlitzky et al. | 711/114 |

OTHER PUBLICATIONS

IBM Corp., "Automatic Swap of the Primary and Secondary Mirrors in a Disk Mirror System," IBM Technical Disclosure Bulletin, vol. 36, No. 12, 1993.

Kitamura et al., "Dynamic Access Load Balancing on the Parallel Secondary Storage," Proc. Second Int'l Symp. Parallel Algorithms/Architecture Synthesis, pp. 316–323, 1997.

Chen, S.; Towsley, D., "A Performance Evaluation of RAID Architectures," IEEE Trans. Computers, vol. 45, No. 10, pp. 1116–1130, Oct. 1996.

Birk, Y., "Deterministic Load–Balancing Schemes for Disk–Based Video–on–Demand Storage Servers," Proc. Fourteenth IEEE Symp. Mass Storage Systems, pp. 17–25, 1995.

Golubchik, L.; Lui, J.C.S.; Muntz, R.R., "Chained Declustering: Load Balancing and Robustness to Skew and Failures," Second Int'l Workshop on Transaction and Query Processing, pp. 88–95, 1992.

Chen, S.; Towsley, D., "Performance of a Mirrored Disk in a Real–Time Transaction System," ACM Sigmetrics, Performance Evaluation, vol. 5, pp. 198–207, 1991.

*Primary Examiner*—Thomas C. Lee
*Assistant Examiner*—Albert Wang
*Attorney, Agent, or Firm*—Fish & Richardson P.C.

[57] ABSTRACT

The invention relates generally to mass storage systems, and in particular to mass storage systems in which stored logical volumes are duplicated in mirrored form. The system includes a method for dynamically adjusting the mirror service policy for a disk drive system by periodically collecting statistics describing the reading and writing of data to mirrored logical volumes of the system in successive time periods and determining, from time to time, from the collected statistics, whether the mirror service policy should continue or should change. In particular, the system takes into account activity levels at the physical devices and results in more efficient accessing of logical volume pairs as well as a better balance of loading and accessing the logical volumes.

22 Claims, 24 Drawing Sheets

| FIELD NAME | DESCRIPTION |
|---|---|
| DMSP_LVL | THE LOGICAL VOLUME NUMBER (SYMM #) OF THE VOLUME |
| DMSP_PERC_SEQ | THE PERCENTAGE OF THE I/O'S IN THE LAST TIME PERIOD THAT WERE SEQUENTIAL. |
| DMSP_RD_LVL | NUMBER OF READS THAT OCCURRED IN THE LAST TIME PERIOD |
| DMSP_WR_LVL | NUMBER OF WRITES THAT APPEARED IN THE LAST TIME PERIOD |
| DMSP_PDL | IDENTIFIERS FOR THE 2 PHYSICAL DEVICES THAT SERVICE THE FIRST 2 REAL MIRRORS FOR THIS LOGICAL VOLUME. PHYSICAL DEVICES ARE REPRESENTED IN TERMS OF DIRECTOR NUMBER, INTERFACE NUMBER, TARGET ID, AND MIRROR NUMBER. RDF MIRRORS NOT PRESENT ON THE LOCAL SYMMETRIX AND RAID-S MIRRORS ARE NOT ALLOWED IN THIS FIELD. |
| DMSP_PREFERRED_DEV | THE PHYSICAL DEVICE THAT THE MIRROR WOULD PREFER TO USE (AFTER EXECUTION OF THE ALGORITHM) |
| DMSP_OLD_POLICY | THE PREVIOUS MIRROR SERVICE POLICY USED FOR THIS LOGICAL VOLUME |
| DMSP_NEW_POLICY | THE NEW MIRROR SERVICE POLICY TO BE USED FOR THIS LOGICAL VOLUME |
| DMSP_PREV_LV_P | NUMBER OF PREVIOUS LOGICAL VOLUME IN DMSP TABLE WHEN THE TABLE HAS BEEN SORTED. |
| DMSP_NEXT_LV_P | NUMBER OF NEXT LOGICAL VOLUME IN DMSP TABLE WHEN THE TABLE HAS BEEN SORTED. |

FIG. 5

| LV | % SEQ. | RD | WR | PDL | PREF. | OLD POLICY | NEW POLICY | POINTER |
|---|---|---|---|---|---|---|---|---|
| 0 | 0 | 0 | 0 | 02000300 | 0 | 0 | 0 | 1 |
| 1 | 0 | 0 | 0 | 02100310 | 0 | 0 | 0 | 2 |
| 2 | 0 | 0 | 0 | 02010301 | 0 | 0 | 0 | 3 |
| 3 | 0 | 0 | 0 | 02110311 | 0 | 0 | 0 | 4 |
| 4 | 0 | 0 | 0 | 02020302 | 0 | 0 | 0 | 5 |
| 5 | 0 | 0 | 0 | 02000302 | 0 | 0 | 0 | 6 |
| 6 | 0 | 0 | 0 | 02100311 | 0 | 0 | 0 | 7 |
| 7 | 0 | 0 | 0 | 02010301 | 0 | 0 | 0 | 8 |
| 8 | 0 | 0 | 0 | 02110310 | 0 | 0 | 0 | 9 |
| 9 | 0 | 0 | 0 | 02020300 | 0 | 0 | 0 | 0 |

FIG. 5A

| LV | % SEQ. | RD | WR | PDL | PREF. | OLD POLICY | NEW POLICY | POINTER |
|---|---|---|---|---|---|---|---|---|
| 0 | 10 | 50 | 10 | 02000300 | 0 | 80 | 0 | 1 |
| 1 | 12 | 40 | 5 | 02100310 | 0 | 80 | 0 | 2 |
| 2 | 25 | 50 | 40 | 02010301 | 0 | 80 | 0 | 3 |
| 3 | 5 | 2 | 90 | 02110311 | 0 | 80 | 0 | 4 |
| 4 | 8 | 88 | 6 | 02020302 | 0 | 80 | 0 | 5 |
| 5 | 74 | 95 | 2 | 02000302 | 0 | 40 | 0 | 6 |
| 6 | 15 | 30 | 60 | 02100311 | 0 | 40 | 0 | 7 |
| 7 | 66 | 20 | 10 | 02010301 | 0 | 40 | 0 | 8 |
| 8 | 50 | 5 | 5 | 02110310 | 0 | 40 | 0 | 9 |
| 9 | 33 | 8 | 90 | 02020300 | 0 | 40 | 0 | FF |

FIG. 5B

| LV | % SEQ. | RD | WR | PDL | PREF. | OLD POLICY | NEW POLICY | POINTER |
|---|---|---|---|---|---|---|---|---|
| 0 | 10 | 50 | 10 | 02000300 | 0 | 80 | 0 | 1 |
| 1 | 12 | 40 | 5 | 02100310 | 0 | 80 | 0 | 7 |
| 2 | 25 | 50 | 38 | 02010301 | 0 | 80 | 0 | 0 |
| 3 | 5 | 2 | 90 | 02110311 | 0 | 80 | 0 | 2 |
| 4 | 8 | 88 | 6 | 02020302 | 0 | 80 | 0 | 3 |
| 5 | 74 | 95 | 2 | 02000302 | 0 | 40 | 0 | 6 |
| 6 | 15 | 30 | 65 | 02100311 | 0 | 40 | 0 | 4 |
| 7 | 66 | 20 | 10 | 02010301 | 0 | 40 | 0 | 8 |
| 8 | 50 | 5 | 5 | 02110310 | 0 | 40 | 0 | FF |
| 9 | 33 | 8 | 90 | 02020300 | 0 | 40 | 0 | 5* |

NOTE: * INDICATES BEGINNING OF SORTED LIST

| DA | ACTIVITY LEVEL |
|---|---|
| 2 | 0 |
| 3 | 0 |

FIG. 5E

| PHYSICAL DRIVE | ACTIVITY LEVEL |
|---|---|
| 0200 | 0 |
| 0210 | 0 |
| 0201 | 0 |
| 0211 | 0 |
| 0202 | 0 |
| 0300 | 0 |
| 0310 | 0 |
| 0301 | 0 |
| 0311 | 0 |
| 0302 | 0 |

| DEVICE 0202 ACTIVITY LEVEL | AMOUNT |
|---|---|
| DA 2 ACTIVITY LEVEL FROM DMSP_DA_ACT_LVL | 0 |
| PHYSICAL DEVICE 0202 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (LOGICAL VOLUME 4) | 47 |
| 50% ACTIVITY LEVEL OF ALL REMAINING LOGICAL VOLUMES ON THE SAME DA (IN THIS CASE, ALL LOGICAL VOLUMES) | 354 |
| TOTAL | 401 |

FIG. 5F

| DEVICE 0300 ACTIVITY LEVEL | AMOUNT |
|---|---|
| DA 3 ACTIVITY LEVEL FROM DMSP_DA_ACT_LVL | 0 |
| PHYSICAL DEVICE 0300 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (LOGICAL VOLUME 0) | 30 |
| 50% ACTIVITY LEVEL OF ALL REMAINING LOGICAL VOLUMES ON THE SAME DA (IN THIS CASE, ALL LOGICAL VOLUMES) | 354 |
| TOTAL | 384 |

| DA | ACTIVITY LEVEL |
|---|---|
| 2 | 0 |
| 3 | 98 |

FIG. 5I

| PHYSICAL DRIVE | ACTIVITY LEVEL |
|---|---|
| 0200 | 0 |
| 0210 | 0 |
| 0201 | 0 |
| 0211 | 0 |
| 0202 | 0 |
| 0300 | 98 |
| 0310 | 0 |
| 0301 | 0 |
| 0311 | 0 |
| 0302 | 0 |

FIG. 5J

| DA | ACTIVITY LEVEL |
|---|---|
| 2 | 48 |
| 3 | 146 |

FIG. 5K

| PHYSICAL DRIVE | ACTIVITY LEVEL |
|---|---|
| 0200 | 48 |
| 0210 | 0 |
| 0201 | 0 |
| 0211 | 0 |
| 0202 | 0 |
| 0300 | 98 |
| 0310 | 0 |
| 0301 | 0 |
| 0311 | 0 |
| 0302 | 48 |

| DEVICE 0210 ACTIVITY LEVEL | AMOUNT |
|---|---|
| DA 2 ACTIVITY LEVEL FROM DMSP_DA_ACT_LVL | 48 |
| PHYSICAL DEVICE 0210 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (LOGICAL VOLUME 1) | 22 |
| 50% ACTIVITY LEVEL OF ALL REMAINING LOGICAL VOLUMES ON THE SAME DA (LOGICAL VOLUMES 0, 1, 2, 3, 4, 7, 8) | 209 |
| TOTAL | 279 |

FIG. 5L

| DEVICE 0311 ACTIVITY LEVEL | AMOUNT |
|---|---|
| DA 3 ACTIVITY LEVEL FROM DMSP_DA_ACT_LVL | 146 |
| PHYSICAL DEVICE 0311 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (LOGICAL VOLUME 3) | 46 |
| 50% ACTIVITY LEVEL OF ALL REMAINING LOGICAL VOLUMES ON THE SAME DA (LOGICAL VOLUMES 0, 1, 2, 3, 4, 7, 8) | 209 |
| TOTAL | 401 |

| DA | ACTIVITY LEVEL |
|---|---|
| 2 | 143 |
| 3 | 146 |

FIG. 5P

| PHYSICAL DRIVE | ACTIVITY LEVEL |
|---|---|
| 0200 | 48 |
| 0210 | 95 |
| 0201 | 0 |
| 0211 | 0 |
| 0202 | 0 |
| 0300 | 98 |
| 0310 | 0 |
| 0301 | 0 |
| 0311 | 0 |
| 0302 | 48 |

| DEVICE 0202 ACTIVITY LEVEL | AMOUNT |
|---|---|
| DA 2 ACTIVITY LEVEL FROM DMSP_DA_ACT_LVL | 143 |
| PHYSICAL DEVICE 0202 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (NONE, SINCE LV 9 IS THE ONLY OTHER USER OF PHYSICAL DRIVE 0202 AND WE'VE ALREADY PROCESSED THAT LOGICAL VOLUME) | 0 |
| 50% ACTIVITY LEVEL OF ALL REMAINING LOGICAL VOLUMES ON THE SAME DA (LOGICAL VOLUMES 0, 1, 2, 3, 7, 8) | 325 |
| TOTAL | 468 |

FIG. 5Q

| DEVICE 0302 ACTIVITY LEVEL | AMOUNT |
|---|---|
| DA 3 ACTIVITY LEVEL FROM DMSP_DA_ACT_LVL | 146 |
| PHYSICAL DEVICE 0302 ACTIVITY LEVEL FROM DSP_PHYS_ACT_LVL | 48 |
| 50% ACTIVITY LEVEL OF ALL REMAINING LOGICAL VOLUMES THAT USE THE SAME PHYSICAL DEVICE (LOGICAL VOLUME 5) | 0 |
| 50% ACTIVITY LEVEL OF ALL REMAINING LOGICAL VOLUMES ON THE SAME DA (LOGICAL VOLUMES 0, 1, 2, 3, 7, 8) | 325 |
| TOTAL | 519 |

| DA | ACTIVITY LEVEL |
|---|---|
| 2 | 237 |
| 3 | 146 |

FIG. 5T

| PHYSICAL DRIVE | ACTIVITY LEVEL |
|---|---|
| 0200 | 48 |
| 0210 | 95 |
| 0201 | 0 |
| 0211 | 0 |
| 0202 | 94 |
| 0300 | 98 |
| 0310 | 0 |
| 0301 | 0 |
| 0311 | 0 |
| 0302 | 48 |

| DEVICE 0211 ACTIVITY LEVEL | AMOUNT |
|---|---|
| DA 2 ACTIVITY LEVEL FROM DMSP_DA_ACT_LVL | 237 |
| PHYSICAL DEVICE 0211 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (LOGICAL VOLUME 8) | 5 |
| 50% ACTIVITY LEVEL OF ALL REMAINING LOGICAL VOLUMES ON THE SAME DA (LOGICAL VOLUMES 0, 1, 2, 7, 8) | 116 |
| TOTAL | 358 |

FIG. 5U

| DEVICE 0311 ACTIVITY LEVEL | AMOUNT |
|---|---|
| DA 3 ACTIVITY LEVEL FROM DMSP_DA_ACT_LVL | 146 |
| PHYSICAL DEVICE 0311 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (NONE, SINCE LV 2 IS THE ONLY OTHER USER OF PHYSICAL DRIVE 0311 AND WE'VE ALREADY PROCESSED THAT LOGICAL VOLUME) | 0 |
| 50% ACTIVITY LEVEL OF ALL REMAINING LOGICAL VOLUMES ON THE SAME DA (LOGICAL VOLUMES 0, 1, 2, 7, 8) | 116 |
| TOTAL | 262 |

| DA | ACTIVITY LEVEL |
|---|---|
| 2 | 237 |
| 3 | 238 |

FIG. 5X

| PHYSICAL DRIVE | ACTIVITY LEVEL |
|---|---|
| 0200 | 48 |
| 0210 | 95 |
| 0201 | 0 |
| 0211 | 0 |
| 0202 | 94 |
| 0300 | 98 |
| 0310 | 0 |
| 0301 | 0 |
| 0311 | 92 |
| 0302 | 48 |

| DEVICE 0201 ACTIVITY LEVEL | AMOUNT |
|---|---|
| DA 2 ACTIVITY LEVEL FROM DMSP_DA_ACT_LVL | 237 |
| PHYSICAL DEVICE 0201 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (LOGICAL VOLUME 7) | 15 |
| 50% ACTIVITY LEVEL OF ALL REMAINING LOGICAL VOLUMES ON THE SAME DA (LOGICAL VOLUMES 0, 1, 7, 8) | 72 |
| TOTAL | 324 |

FIG. 5Y

| DEVICE 0301 ACTIVITY LEVEL | AMOUNT |
|---|---|
| DA 3 ACTIVITY LEVEL FROM DMSP_DA_ACT_LVL | 238 |
| PHYSICAL DEVICE 0301 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (LOGICAL VOLUME 7) | 15 |
| 50% ACTIVITY LEVEL OF ALL REMAINING LOGICAL VOLUMES ON THE SAME DA (LOGICAL VOLUMES 0, 1, 7, 8) | 72 |
| TOTAL | 325 |

| DA | ACTIVITY LEVEL |
|---|---|
| 2 | 325 |
| 3 | 238 |

FIG. 5AB

| PHYSICAL DRIVE | ACTIVITY LEVEL |
|---|---|
| 0200 | 48 |
| 0210 | 95 |
| 0201 | 88 |
| 0211 | 0 |
| 0202 | 94 |
| 0300 | 98 |
| 0310 | 0 |
| 0301 | 0 |
| 0311 | 92 |
| 0302 | 48 |

| DEVICE 0200 ACTIVITY LEVEL | AMOUNT |
|---|---|
| DA 2 ACTIVITY LEVEL FROM DMSP_DA_ACT_LVL | 325 |
| PHYSICAL DEVICE 0200 ACTIVITY LEVEL FROM DSP_PHYS_ACT_LVL | 48 |
| 50% ACTIVITY LEVEL OF ALL REMAINING LOGICAL VOLUMES THAT USE THE SAME PHYSICAL DEVICE (NONE, SINCE LV 5 IS THE ONLY OTHER USER OF PHYSICAL DRIVE 0200 AND WE'VE ALREADY PROCESSED THAT LOGICAL VOLUME) | 0 |
| 50% ACTIVITY LEVEL OF ALL REMAINING LOGICAL VOLUMES ON THE SAME DA (LOGICAL VOLUMES 1, 7, 8) | 42 |
| TOTAL | 415 |

FIG. 5AC

| DEVICE 0300 ACTIVITY LEVEL | AMOUNT |
|---|---|
| DA 3 ACTIVITY LEVEL FROM DMSP_DA_ACT_LVL | 238 |
| PHYSICAL DEVICE 0300 ACTIVITY LEVEL FROM DSP_PHYS_ACT_LVL | 98 |
| 50% ACTIVITY LEVEL OF ALL REMAINING LOGICAL VOLUMES THAT USE THE SAME PHYSICAL DEVICE (NONE, SINCE LV 9 IS THE ONLY OTHER USER OF PHYSICAL DRIVE 0300 AND WE'VE ALREADY PROCESSED THAT LOGICAL VOLUME) | 0 |
| 50% ACTIVITY LEVEL OF ALL REMAINING LOGICAL VOLUMES ON THE SAME DA (LOGICAL VOLUMES 1, 7, 8) | 42 |
| TOTAL | 378 |

| DA | ACTIVITY LEVEL |
|---|---|
| 2 | 325 |
| 3 | 298 |

FIG. 5AF

| PHYSICAL DRIVE | ACTIVITY LEVEL |
|---|---|
| 0200 | 48 |
| 0210 | 95 |
| 0201 | 88 |
| 0211 | 0 |
| 0202 | 94 |
| 0300 | 158 |
| 0310 | 0 |
| 0301 | 0 |
| 0311 | 92 |
| 0302 | 48 |

| DEVICE 0210 ACTIVITY LEVEL | AMOUNT |
|---|---|
| DA 2 ACTIVITY LEVEL FROM DMSP_DA_ACT_LVL | 325 |
| PHYSICAL DEVICE 0210 ACTIVITY LEVEL FROM DSP_PHYS_ACT_LVL | 95 |
| 50% ACTIVITY LEVEL OF ALL REMAINING LOGICAL VOLUMES THAT USE THE SAME PHYSICAL DEVICE (NONE, SINCE LV 6 IS THE ONLY OTHER USER OF PHYSICAL DRIVE 0210 AND WE'VE ALREADY PROCESSED THAT LOGICAL VOLUME) | 0 |
| 50% ACTIVITY LEVEL OF ALL REMAINING LOGICAL VOLUMES ON THE SAME DA (LOGICAL VOLUMES 7, 8) | 20 |
| TOTAL | 440 |

FIG. 5AG

| DEVICE 0310 ACTIVITY LEVEL | AMOUNT |
|---|---|
| DA 3 ACTIVITY LEVEL FROM DMSP_DA_ACT_LVL | 298 |
| PHYSICAL DEVICE 0310 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (LOGICAL VOLUME 8) | 5 |
| 50% ACTIVITY LEVEL OF ALL REMAINING LOGICAL VOLUMES ON THE SAME DA (LOGICAL VOLUMES 7, 8) | 20 |
| TOTAL | 323 |

| DA | ACTIVITY LEVEL |
|---|---|
| 2 | 325 |
| 3 | 343 |

FIG. 5AJ

| PHYSICAL DRIVE | ACTIVITY LEVEL |
|---|---|
| 0200 | 48 |
| 0210 | 95 |
| 0201 | 88 |
| 0211 | 0 |
| 0202 | 94 |
| 0300 | 158 |
| 0310 | 45 |
| 0301 | 0 |
| 0311 | 92 |
| 0302 | 48 |

| DEVICE 0201 ACTIVITY LEVEL | AMOUNT |
|---|---|
| DA 2 ACTIVITY LEVEL FROM DMSP_DA_ACT_LVL | 325 |
| PHYSICAL DEVICE 0201 ACTIVITY LEVEL FROM DSP_PHYS_ACT_LVL | 88 |
| 50% ACTIVITY LEVEL OF ALL REMAINING LOGICAL VOLUMES THAT USE THE SAME PHYSICAL DEVICE (NONE, SINCE LV 2 IS THE ONLY OTHER USER OF PHYSICAL DRIVE 0201 AND WE'VE ALREADY PROCESSED THAT LOGICAL VOLUME) | 0 |
| 50% ACTIVITY LEVEL OF ALL REMAINING LOGICAL VOLUMES ON THE SAME DA (LOGICAL VOLUMES 8) | 5 |
| TOTAL | 418 |

FIG. 5AK

| DEVICE 0301 ACTIVITY LEVEL | AMOUNT |
|---|---|
| DA 3 ACTIVITY LEVEL FROM DMSP_DA_ACT_LVL | 343 |
| PHYSICAL DEVICE 0301 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (NONE, SINCE LV 2 IS THE ONLY OTHER USER OF PHYSICAL DRIVE 0301 AND WE'VE ALREADY PROCESSED THAT LOGICAL VOLUME) | 0 |
| 50% ACTIVITY LEVEL OF ALL REMAINING LOGICAL VOLUMES ON THE SAME DA (LOGICAL VOLUMES 8) | 5 |
| TOTAL | 348 |

| DA | ACTIVITY LEVEL |
|---|---|
| 2 | 325 |
| 3 | 373 |

FIG. 5AN

| PHYSICAL DRIVE | ACTIVITY LEVEL |
|---|---|
| 0200 | 48 |
| 0210 | 95 |
| 0201 | 88 |
| 0211 | 0 |
| 0202 | 94 |
| 0300 | 158 |
| 0310 | 45 |
| 0301 | 30 |
| 0311 | 92 |
| 0302 | 48 |

| DEVICE 0211 ACTIVITY LEVEL | AMOUNT |
|---|---|
| DA 2 ACTIVITY LEVEL FROM DMSP_DA_ACT_LVL | 325 |
| PHYSICAL DEVICE 0211 ACTIVITY LEVEL FROM DSP_PHYS_ACT_LVL | 0 |
| 50% ACTIVITY LEVEL OF ALL REMAINING LOGICAL VOLUMES THAT USE THE SAME PHYSICAL DEVICE (NONE, SINCE LV 3 IS THE ONLY OTHER USER OF PHYSICAL DRIVE 0211 AND WE'VE ALREADY PROCESSED THAT LOGICAL VOLUME) | 0 |
| 50% ACTIVITY LEVEL OF ALL REMAINING LOGICAL VOLUMES ON THE SAME DA (NONE LEFT) | 0 |
| TOTAL | 325 |

FIG. 5AP

| DEVICE 0310 ACTIVITY LEVEL | AMOUNT |
|---|---|
| DA 3 ACTIVITY LEVEL FROM DMSP_DA_ACT_LVL | 373 |
| PHYSICAL DEVICE 0310 ACTIVITY LEVEL FROM DSP_PHYS_ACT_LVL | 45 |
| 50% ACTIVITY LEVEL OF ALL REMAINING LOGICAL VOLUMES THAT USE THE SAME PHYSICAL DEVICE (NONE, SINCE LV 1 IS THE ONLY OTHER USER OF PHYSICAL DRIVE 0310 AND WE'VE ALREADY PROCESSED THAT LOGICAL VOLUME) | 0 |
| 50% ACTIVITY LEVEL OF ALL REMAINING LOGICAL VOLUMES ON THE SAME DA (NONE LEFT) | 0 |
| TOTAL | 418 |

| DA | ACTIVITY LEVEL |
|---|---|
| 2 | 335 |
| 3 | 373 |

| PHYSICAL DRIVE | ACTIVITY LEVEL |
|---|---|
| 0200 | 48 |
| 0210 | 95 |
| 0201 | 88 |
| 0211 | 10 |
| 0202 | 94 |
| 0300 | 158 |
| 0310 | 45 |
| 0301 | 30 |
| 0311 | 92 |
| 0302 | 48 |

FIG. 5AS

| LV | % SEQ. | RD | WR | PDL | PREF. | OLD POLICY | NEW POLICY | POINTER |
|---|---|---|---|---|---|---|---|---|
| 0 | 10 | 50 | 10 | 02000300 | 0300 | 80 | 0 | 1 |
| 1 | 12 | 40 | 5 | 02100310 | 0310 | 80 | 0 | 7 |
| 2 | 25 | 50 | 38 | 02010301 | 0201 | 80 | 0 | 0 |
| 3 | 5 | 2 | 90 | 02110311 | 0311 | 80 | 0 | 2 |
| 4 | 8 | 88 | 6 | 02020302 | 0202 | 80 | 0 | 3 |
| 5 | 74 | 95 | 2 | 02000302 | FF | 40 | 00 | 6 |
| 6 | 15 | 30 | 65 | 02100311 | 0210 | 40 | 0 | 4 |
| 7 | 66 | 20 | 10 | 02010301 | 0301 | 40 | 0 | 8 |
| 8 | 50 | 5 | 5 | 02110310 | 0211 | 40 | 0 | FF |
| 9 | 33 | 8 | 90 | 02020300 | 0300 | 40 | 0 | 5* |

FIG. 5AT

| LV | % SEQ. | RD | WR | PDL | PREF. | OLD POLICY | NEW POLICY | POINTER |
|---|---|---|---|---|---|---|---|---|
| 0 | 10 | 50 | 10 | 02000300 | 0300 | 80 | 40 | 1 |
| 1 | 12 | 40 | 5 | 02100310 | 0310 | 80 | 40 | 7 |
| 2 | 25 | 50 | 38 | 02010301 | 0201 | 80 | 80 | 0 |
| 3 | 5 | 2 | 90 | 02110311 | 0311 | 80 | 40 | 2 |
| 4 | 8 | 88 | 6 | 02020302 | 0202 | 80 | 80 | 3 |
| 5 | 74 | 95 | 2 | 02000302 | FF | 40 | 00 | 6 |
| 6 | 15 | 30 | 65 | 02100311 | 0210 | 40 | 80 | 4 |
| 7 | 66 | 20 | 10 | 02010301 | 0301 | 40 | 40 | 8 |
| 8 | 50 | 5 | 5 | 02110310 | 0211 | 40 | 80 | FF |
| 9 | 33 | 8 | 90 | 02020300 | 0300 | 40 | 40 | 5* |

FIG. 5AU

DYNAMIC ADJUSTMENT OF MIRROR SERVICE POLICY FOR LOGICAL VOLUMES IN A DISK DRIVE SYSTEM BASED ON COLLECTED STATISTICS

BACKGROUND OF THE INVENTION

The invention relates generally to mass storage systems, and in particular, to mass storage systems in which stored logical volumes are duplicated in mirrored form.

Mass storage systems have grown significantly in capacity over the past years while maintaining a lower cost per stored byte. Accordingly, various methods and systems have been developed for increasing the reliability of the systems and to protect against failures. One such policy includes the storage of two or more copies of the data in what are called mirrored drives. This system operates to maintain all copies up to date, although at any particular moment, one or another copy may be the most complete. Most typically, there are two copies.

In a typical system, each physical drive is often divided into a plurality of logical volumes. Under these circumstances, each logical volume appears to the host computer or computers to be a separate drive and operations take place with regard to the logical volume as if it were a physical volume. Accordingly, some logical volumes may be accessed substantially more often for read and/or write operations, and the nature of the operations may vary from random accesses to sequential accesses during any particular sequence of read or write operations. Depending upon the nature and variety of read and write operations to a physical drive containing many logical volumes, the disk read/write heads may be severely worked and the access time may, on average, be increased if sequential read and write locations are not located near one another.

One method for combating such problems is to set a mirror service policy, statically, which attempts to optimize the reading and writing of data. Such a policy may, for example, assume that most data transfers are sequential in nature, or that they are random. The policies can include, for example, interleaved, mixed, dedicated, or other policies which appear, after reviewing the manner in which a drive is to be used, to provide the best average time access to the data.

One such policy is to only service requests that fall within the first half of a logical volume. Another policy might be to only service requests that fall in odd groups with a group being defined in terms of a number of blocks. For instance the first group (blocks 0–959) will be serviced by copy 1 and the next group by copy 2, etc. The limitations of these policies are due to its static nature. These policies are chosen at system configuration time and never change. Some static policies favor sequential access patterns while others favor random access patterns. Because of users' changing access patterns, neither one is optimal.

SUMMARY OF THE INVENTION

Accordingly, the invention relates to a method for dynamically adjusting the mirror service policy for a disk drive system by periodically collecting statistics describing the reading and writing of data to mirrored logical volumes of the system in successive time periods, determining from the collected statistics a loading of each mirrored logical volume group (often a pair) and in a preferred embodiment determining a measure of efficiency in accessing each of the mirrored logical volume pairs, and dynamically adjusting or changing the mirrored service policy for each mirrored group, as necessary, to more evenly balance the loading of the mirrored logical volume groups and of the storage system.

The method further features the step of periodically repeating the collecting and determining steps, and in response thereto, dynamically and periodically changing the mirror service policy for the disk drive logical volumes. According to another aspect of the invention, there is further featured the step of collecting statistics describing each logical volume which includes the number of reads during a last time period, the number of writes during the last time period, and the percentage of input/output operations in the last time period which are sequential in nature.

The invention thus advantageously, adaptively and dynamically changes the mirror service policy for each logical volume group of a system to adjust to the particular manner in which the logical volumes are being accessed. While this can only occur efficiently with regard to read operations, wherein no change of the data stored on a logical volume is made, the adjustment not only improves the mean time between failure of the physical drives, but decreases the seek time within which data is recalled from a physical drive. The method and apparatus also advantageously balance the load across the system by determining which controllers have the highest level of activity and choosing policies to alleviate any existing high load conditions.

BRIEF DESCRIPTION OF THE DRAWING

Other features and advantages of the invention will be apparent from the following description taken together with the drawings in which:

FIG. 5 is a description of the DMSP_TABLE; and

FIGS. 5A–5AU are tables illustrating a working example in accordance with a preferred embodiment of the invention.

DESCRIPTION OF PREFERRED PARTICULAR EMBODIMENTS

Figure 1:
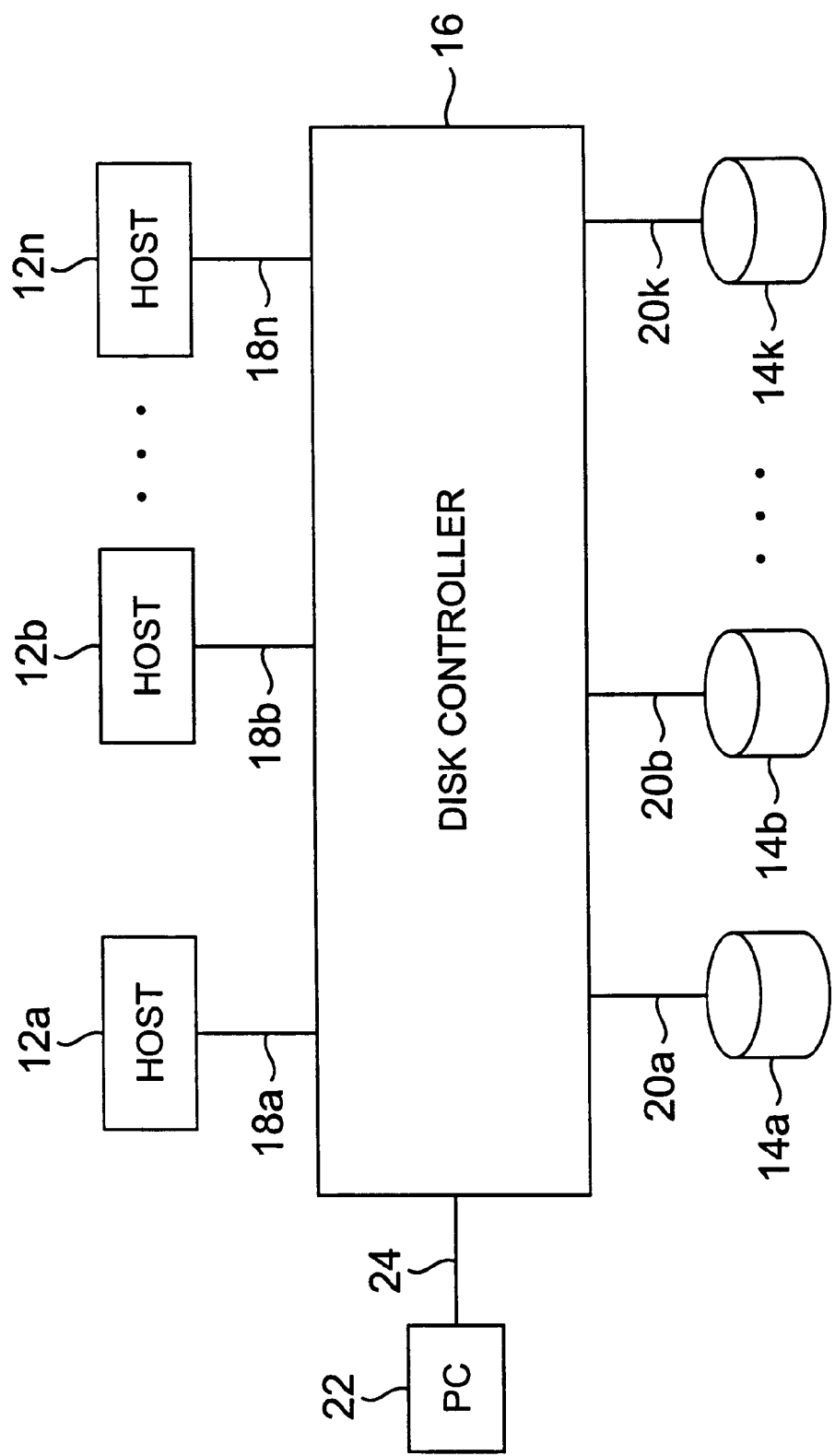
FIG. 1 is a schematic block diagram of a system in which the invention can be employed.

Referring to FIG. 1, the invention relates to a storage system 10 which receives data and commands from, and delivers data and responses to, a plurality of host computers 12a, 12b, . . . , 12n. The storage system 10 is a mass storage system having a disk drive controller 16 and a plurality of disk drive elements 14a, 14b, . . . , 14k. The controller 16 interconnects the host computers 12 and the disk drive elements 14, and can be, for example, that made by EMC and known as the Symmetrix controller. The disk drive controller 16 thus receives memory write commands from the various host computers over buses 18a, 18b, . . . , 18n, respectively, for example, connected and operated in accordance with a SCSI protocol, and delivers the data associated with those commands to the appropriate disk drive elements 14 over respective connecting buses 20a, 20b, . . . 20k. Buses 20 also preferably operate in accordance with a SCSI protocol. The controller also receives read commands from the host computers over buses 18, and delivers requested data to the computer, either from a cache memory of the controller or, if the data is not available in cache memory, from the disk drive elements.

Each of the disk drive elements 14 typically has in excess of nine gigabytes of storage and is logically divided, in accordance with known techniques, into a plurality of logical volumes. Each disk drive element 14 can thus have a plurality of logical volumes, for example 4, 8, or more logical volumes on a single disk drive element. In a typical configuration, the controller system also connects to a console PC 22 through a connecting bus 24. Console PC 22 is used for maintenance and access to the controller and can be employed to set parameters of the controller as is well known in the art.

Figure 2:
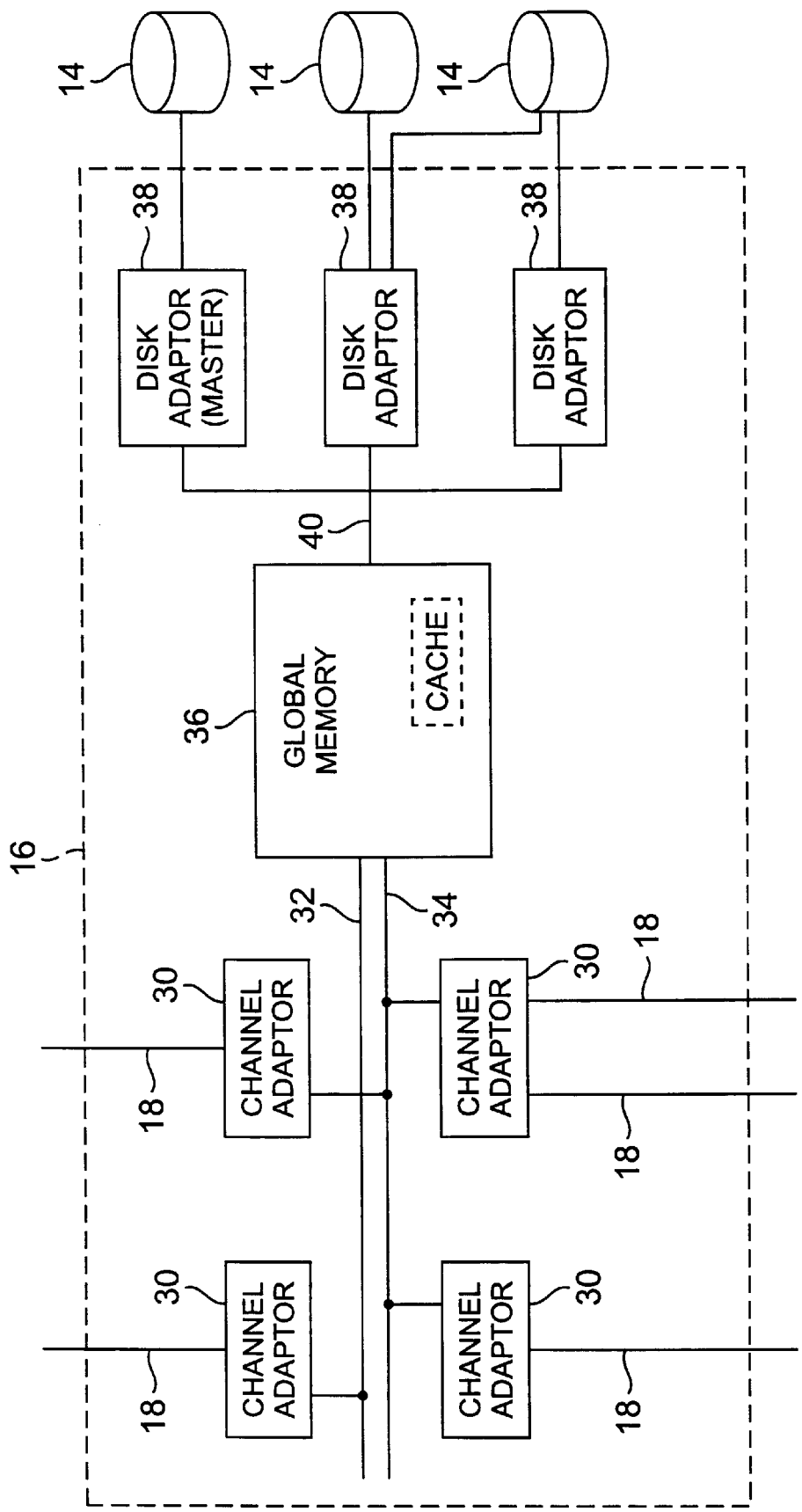
FIG. 2 is a more detailed schematic block diagram of an exemplary disk controller system.

In operation, the host computers 12*a*, 12*b*, . . . send, as required by the applications they are running, commands to the mass storage devices requesting data stored in the logical volumes or providing data to be written to the logical volumes. Referring to FIG. 2, and using the EMC Symmetrix controller as an illustrative example, the communications from the host computer typically connects to a port of a plurality of channel directors 30 over the SCSI bus lines 18. Each channel director, in turn, connects over one or more system busses 32 or 34 to a global memory 36. The global memory is preferably a large memory through which the channel directors can communicate to the disk drives and can include the controller's cache memory. Also connected to the global memory are a plurality of disk directors or disk adapters 38 which control the disk drive elements 14. The disk adapters also communicate with the global memory 36 over, preferably, SCSI busses 40.

In accordance with the invention, the disk adapters can read data from the global memory and write it to the logical volumes for which they are responsible, and read data, in response to a read command, from a logical volume and write that data to global memory for later delivery by the channel adaptor to the requesting host.

In a configuration wherein multiple copies of a logical volume are maintained, that is, in particular, where two copies of data are separately stored in two different logical volumes, it is said that mirror copies are maintained. (There can, in other embodiments of the invention, be more than two mirrored copies, for example, there can be four or more mirrored copies. Typically, for purposes of this embodiment, paired copies are employed). The controller can then respond to a read request by reading from either of the copies stored in the disk elements. Accordingly, there is implemented in the disk controller, and among the disk adapters, a mirror service policy which identifies which of the adapters is responsible for reading in response to requests from a host computer. Ordinarily, this policy is fixed at the beginning of a system set up, taking into account the expected loads, and does not change. However, in accordance with the preferred embodiment of the invention, there is provided a dynamic mirror service policy implementation in which the service policy can be modified, periodically, which responds to statistics describing the nature of the read and write requests to the mass storage system, to change the mirror service policy periodically during the operation of the storage system.

The dynamic mirror service policy (DMSP) uses the advantages of the static mirror service policies, but provides significant advantages, not previously available or contemplated, by addressing their limitations and making periodic adjustments to the selected policies. Over a given time period, data access information is collected; and at the end of the period, a decision is made for each logical volume about the best policy to use for it. Logical volumes with higher access rates get more preferential treatment than volumes with lower access rates. The information collected includes access rates for both read and write operations and how sequential the accesses were during the time period. Many factors are included in the policy decisions. These factors include: the activity level of the physical disks (copies) involved, the activity level of the disk storage directors involved, how sequential the accesses were, and the relationships between the different host addressable volumes that use the same mirrored disks.

Figure 3:
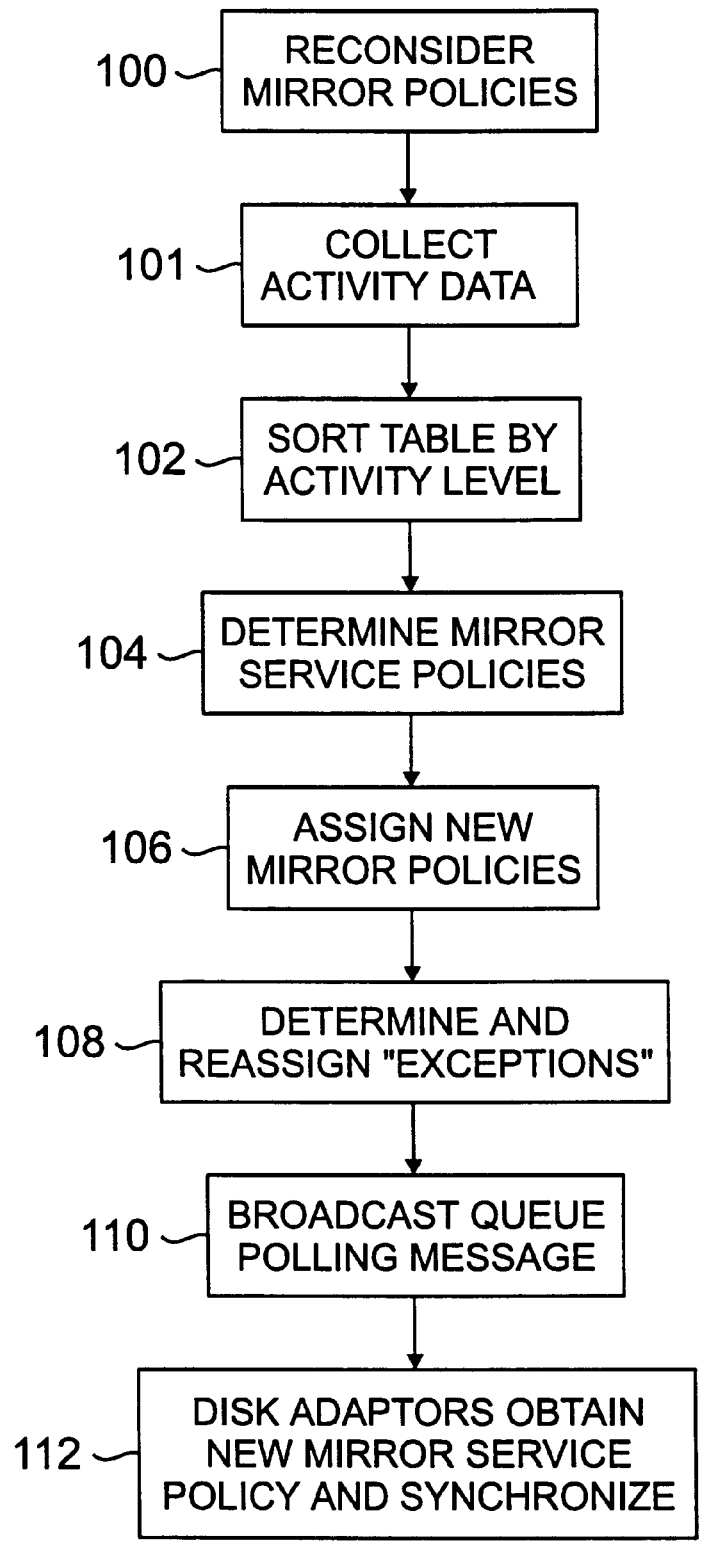
FIG. 3 is a flow diagram illustrating the command flow in accordance with a preferred embodiment of the invention.

The recalculation of the mirror service policies will happen infrequently and are handled as a low priority task in a disk adaptor 38 designated the Master DA. This operation, however, may be spread across multiple disk adapters (DA's) to reduce the performance impact on a single DA. Once the time has come to make a decision on the new policies (step 100 (FIG. 3)), statistics for all logical volumes, which have been collected (step 101) in a table, are reviewed. The logical volumes in this table are thus sorted by activity level (step 102) and then a decision will be made about which mirror would best service each logical volume (or portion thereof) based on the prior periods' activity levels for the physical devices and disk adapters that service that logical volume (step 104). Once this "best mirror" decision has been made for all logical volumes (or portion thereof), mirror service policies are assigned (step 106) consistent with the decisions, with, perhaps, a couple of exceptions (step 108). Among the decision criteria, the system determines if a high ratio of sequential I/O operations is detected, in which instance, an interleave policy may be chosen, or if random I/O operations are detected, and there are no other logical volumes that use the same two mirrors, in which case a mix policy can be chosen so that the advantage of having two mirrors is not wasted.

A mirror service policy is a rule which defines when each mirror is responsible for servicing the logical volume. More particularly, the mirror service policies which can be implemented, include an interleaved, a mixed, a mirror one only, and a mirror two only service policy. The interleaved mirror service policy provides that the mirrors alternate which cylinders of a logical volume they serve. The interleave factor can range from every other cylinder to every, for example, 32,768 cylinders. In the tables which follow, this mirror service policy is represented by the code "$00". The mixed mirror service policy is a service policy wherein one mirror services the first half of the logical volume and the other mirror services the other half of the logical volume. This mirror service policy is represented in the tables which follow as code "$C1". The mirror one and mirror two service policies provide that only mirror one or mirror two, as the case may be, services the logical volume. These mirror service policies are represented by code "$80" (a mirror one only service policy) or code "$40" (a mirror two only service policy) in the tables which follow.

Once the new policies have been calculated the GST Queue is used to broadcast a message to all disk adapters (step 110) to start polling the queue more frequently. Once all disk adapters are polling more frequently, an update message is sent through the GST Queue (a method for the disk adapters to communicate with each other (preferably through global memory)) telling disk adapters to obtain the new mirror service policies, for their logical volumes, from global memory (step 112). For this message, all the disk adapters will be synchronized and there can be a brief (less than 100 ms) pause across all disk adapters while this command is executed.

As noted above, the operation, according to the invention, will be controlled by one disk director that is the master. In the event of a failure of the master director, a designated back-up director will be responsible for the operation of the system.

As noted above, the mirror service policy decision operation will be executed as a very low priority background task, for example, implemented every ten minutes. After execution of the decision process begins, the process can be executed in fragments so there is no significant time during which the master disk director is unavailable to process incoming requests. The fragment size (if needed) can be selectable and will be determined, for example, in terms of how many logical volumes to examine before resuming, temporarily, normal disk adaptor operation.

Figure 4A:
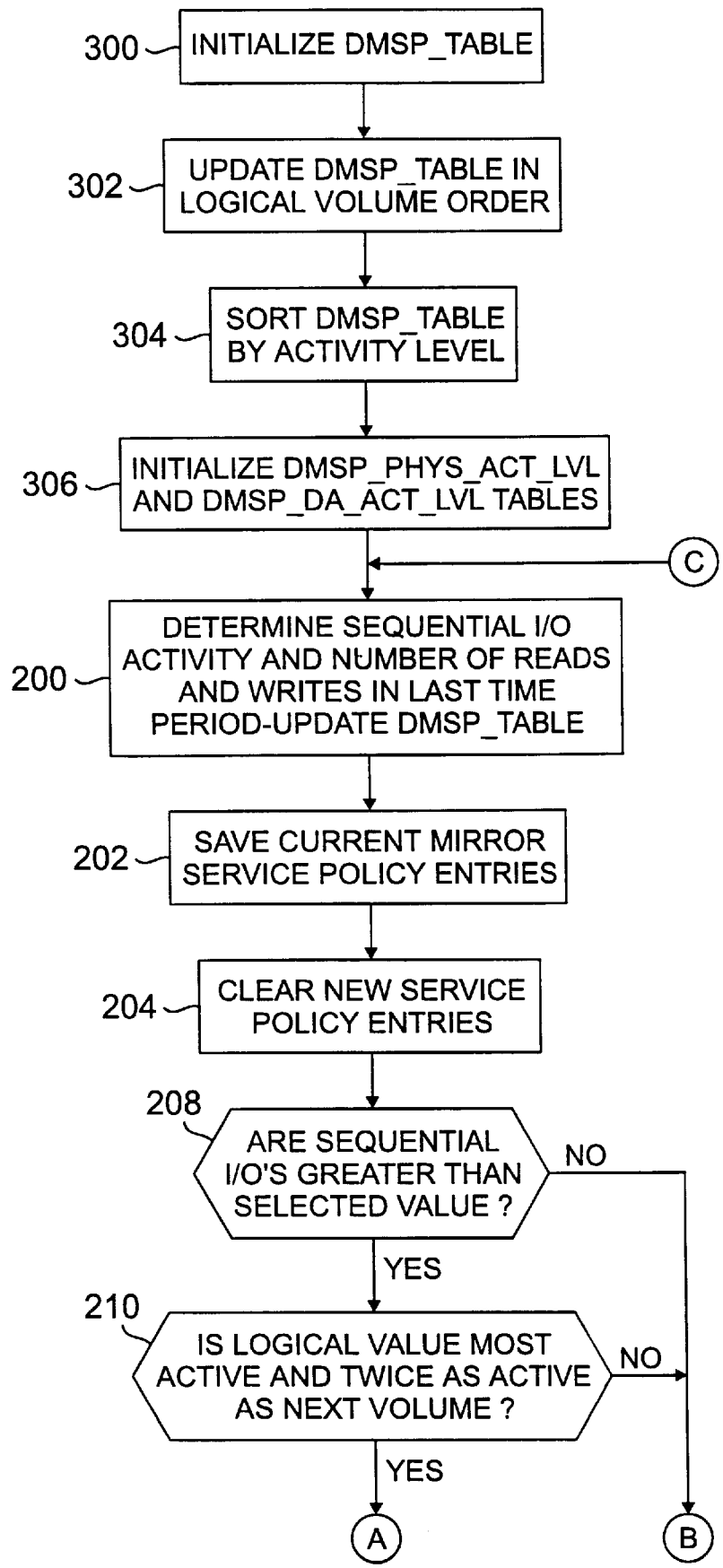
FIGS. 4A, 4B, and 4C are collectively a flow diagram illustrating operations in accordance with the invention.
Figure 4B:
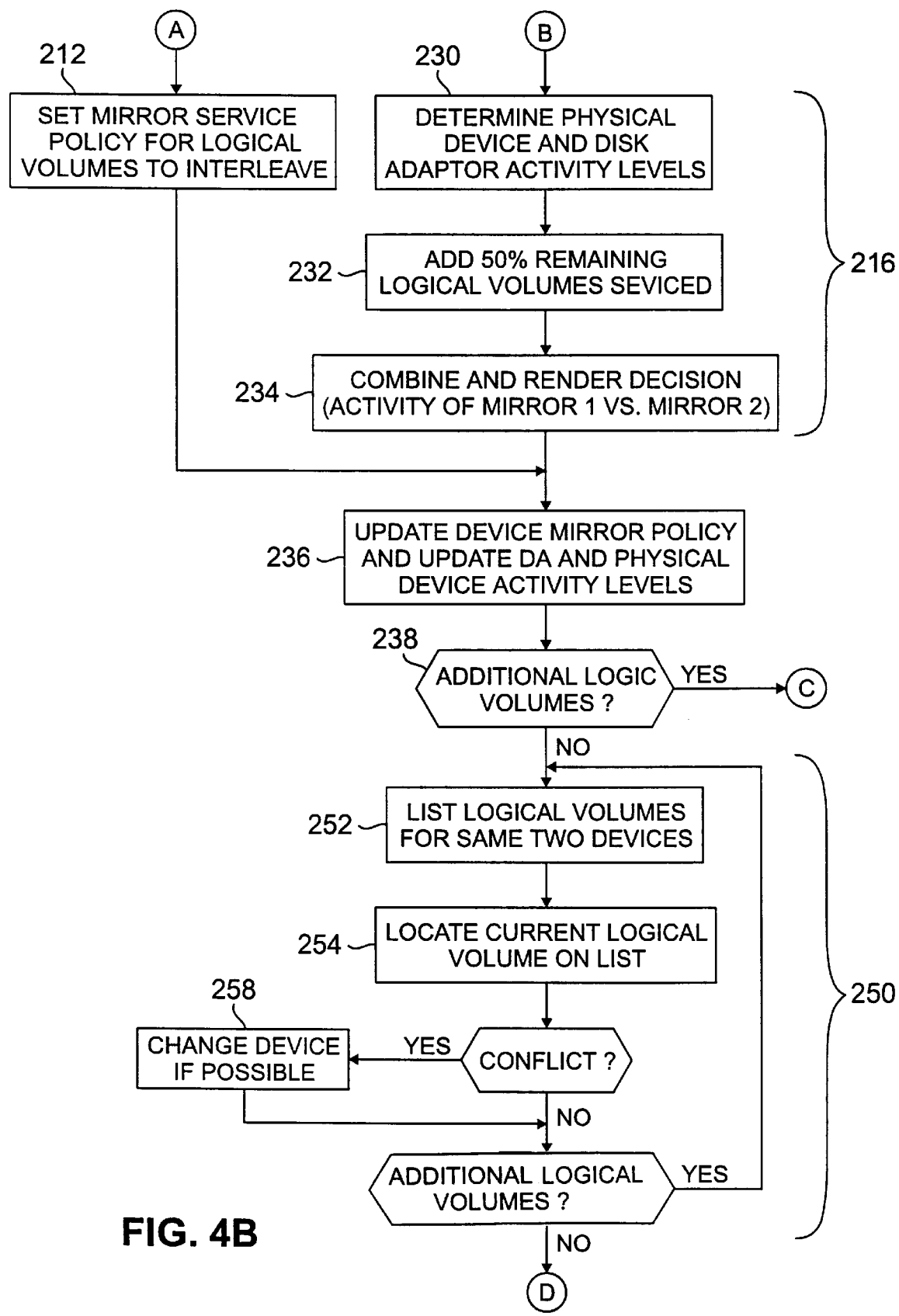
Figure 4C:
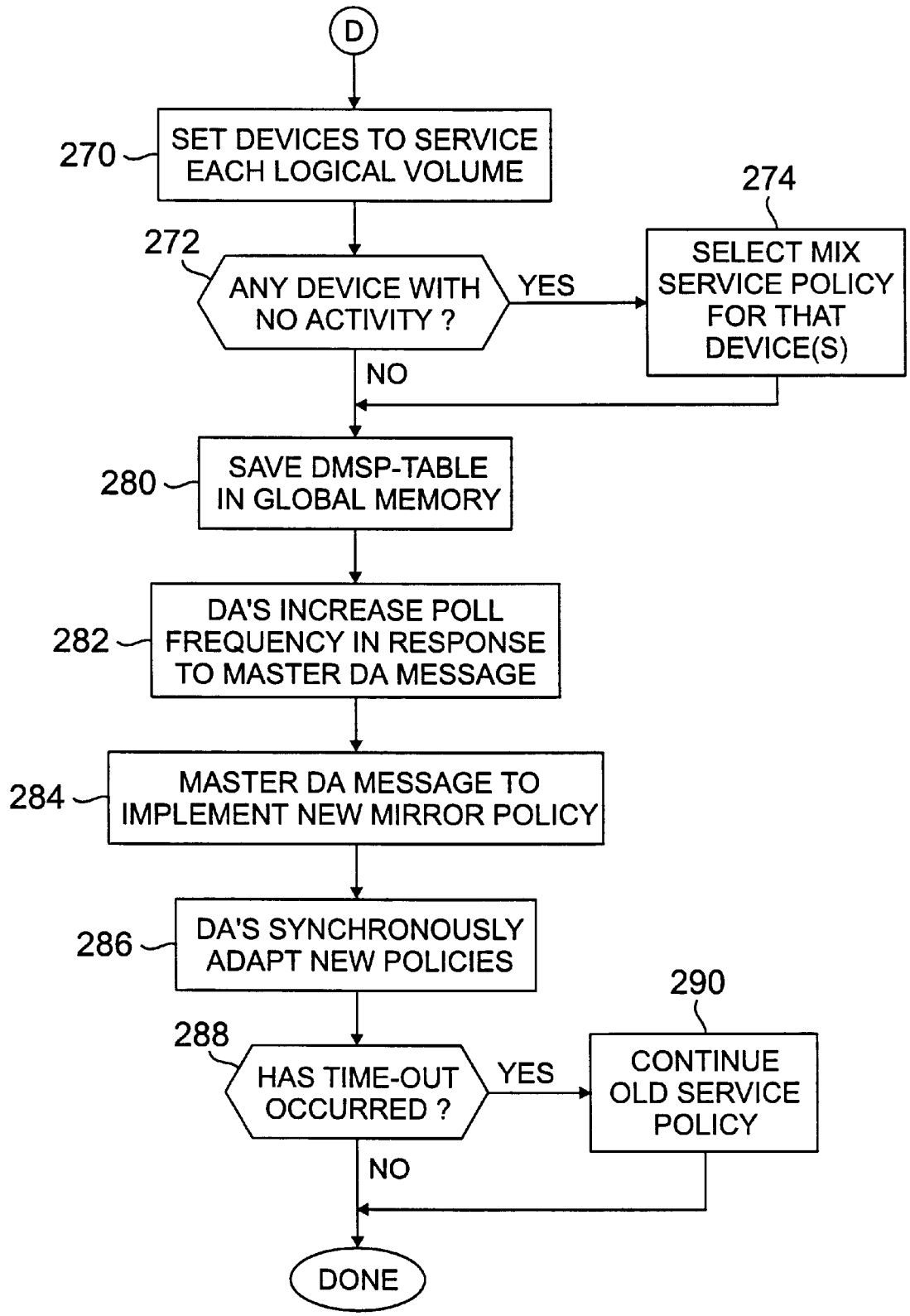

Once it is determined that it is time to run the policy determination process, the master disk adaptor will begin filling in the dynamic portions of the fundamental parameter table (described in FIG. 5), called the DMSP_TABLE, in local memory. The static portions of the DMSP_TABLE will be initialized only once (step 300, FIGS. 4A, 4B, 4C), during the master director's initialization process. The DMSP_TABLE contains a unique location 130 (FIG. 5A) for, for example, the top "n" (for example 500) most active volumes (to conserve both space and time) although in other embodiments more or fewer volumes, or every logical device in the system can be accounted for. (Logical volumes that do not have two true mirror devices will have their DMSP_LV parameter set to an invalid value to indicate that the data in the DMSP_TABLE for that volume is not valid.

The table will be updated, in logical volume order (step 302), and then sorted by activity level (step 304). In the illustrated embodiment, the activity level will be a combination of the values of DMSP_RD_LVL and DMSP_WR_LVL, (defined below), the weighting applied to the two values being adjustable. (Initially, the weighting shall start at 100% of the DMSP_RD_LVL and 50% of the $DMSP_{13}$_WR_LVL). The sort process will result in a singularly linked list (FIG. 5B) which can be sorted, if desired, by logical volume activity level with the most active volumes at the beginning of the list or sorted using pointers as illustrated in FIG. 5B.

The DMSP_PHYS_ACT_LVL and DMAP_DA_ACT_LVL tables indicating, respectively, how active each physical volume will be under a new mirror policy (DMSP_PAL) and how active each disk adaptor (DA) will be under a new mirror service policy (DMSP_DAAL), will be initialized to 0 (step 306) at this time.

With the tables initialized, the core of the decision process begins with the first logical volume in the DMSP_TABLE (the one with the highest activity level) (FIG. 5B). First the percentage of Sequential IO activity in the last time period (DMSP_PERC_SEQ), and the number of reads (DSP_RD_LVL) and the number of writes (DMSP_WR_LVL) are determined and updated in the table (step 200). The current mirror service policy will be saved (DMSP_OLD_POLICY), (step 202) and the new mirror service policy will be cleared (DMSP_NEW_POLICY) (step 204).

Next, a decision about which physical device a logical volume should be serviced by must be made (step 206). This decision will be made one of two ways:

1) If the sequential I/O level (DMSP_PERC_SEQ) is above a selected value (the default value is 60%) (step 208) and the logical volume is the most active on the physical device and it is more than twice as active as the next most active logical volume (step 210), then the mirror service policy is set to Interleave and the DMSP_PREFERRED_DEV will be set to indicate that both devices should be used in an interleaved manner (step 212).

2) Otherwise, the activity levels for the physical disks and disk adapters involved will be compared (while variable, the disk adaptor weighting default value is 20%) and the combination with the least activity will be chosen to service this logical volume (step 216).

To effect the second alternative, the DMSP_DA_ACT_LVL and DMSP_PHYS_ACT_LVL tables will be used. The activity level of a physical device and of a DA is determined by using the actual activity levels collected so far (From DMSP_DA_ACT_LVL and DMSP_PHYS_ACT_LVL tables for logical volumes already processed) (step 230) and adding to that, 50% of the activity for all the remaining logical volumes that are serviced by the physical device or DA (step 232). These two numbers (the calculated activity level of the physical disk and the calculated activity level of the DAs involved) are combined (though variable, the DA weighting default value is 20%) and are used as a decision parameter for whether the physical disk should service this logical volume under the new mirror service policy. (step 234) Once that decision is made, the DMSP_PREFERRED_DEV is updated in the DMSP_TABLE and the activity level for the current logical volume is added to the corresponding areas in the DMSP_DA_ACT_LVL and DMSP_PHYS_ACT_LVL tables (step 236) and the process is repeated (step 238).

Once the preferred mirror to service every logical volume has been determined, the method of the invention then re-processes every logical volume to perform a seek minimization step 250. In this step, a list is made of all the logical devices that use the same two physical devices (step 252). Once this list has been made, the position of the current logical volume in the list (1st half or 2nd half) is compared against the device that was chosen (DMSP_PREFERRED_DEV) (step 254). If a device was chosen which conflicts with the position in the logical volume list, then this logical volume's preferred device will be changed, if possible (step 258). In order to effect this change, another logical volume must be found that has the same problem, but falls in the other half of the logical volume list for the physical devices. If such a volume is found, and the activity level of that volume is within some range of the current volume (while range is a variable, a default value of 1000 I/O's in the time interval is selected), then the preferred devices on both logical volumes are swapped. Using this technique a balance is maintained and seeks are optimized.

Next, the DMSP_NEW_POLICY can be created for each logical volume. Starting again at the top of the sorted list, the mirror service policy will be set such that it allows the DMSP_PREFERRED_DEV to service that logical volume (step 270). If one of the physical volumes for the logical volume has no activity recorded against it in the DMSP_PHYS_ACT_LVL table (step 272), then a Mix service policy will be chosen and a value will be put in the DMSP_PHYS_ACT_LVL for the device that had no activity for it and that device will not be used again (step 274). This ensures that there are no idle actuators.

Once all the mirror service policies have been decided upon, the master DA will save the DMSP_TABLE in global memory to make it globally accessible, and then make the GST Queue entry to all DA's (step 280). The message sent will ask all DA's to increase the frequency of GST Queue polls (step 282). Once all DA's have acknowledged this request, the master DA will make another GST Queue entry with a message instructing all DA's to adopt the new mirror service policy (step 284). At this time all dA's will update their mirror service policies to match those in the DMSP_TABLE in global memory for their logical volumes. The will all do this at the same time (step 286) and will not continue with other tasks until all DA's have acknowledged this message. This is a synchronous update. As noted above, there will be a brief time (less than 100 milliseconds) during this update that the directors do not process new requests. The system also provides a "time-out" regarding the global acknowledgment of the master DA's message, and if the time-out occurs, all directors revert to the original mirror service policy (steps 288, 290).

EXAMPLE

In the example which follows, which further illustrates and clarifies the operations in accordance with the invention, it is assumed that the system has ten logical volumes and ten physical disks for two different disk adapters (labelled DA2 and DA3). The physical disks are mirrored, that is the same logical volume appears on two different physical disks, and there are two logical volumes for each mirrored pair. Further, in this example, it is assumed that the weightings between disk adaptor activity levels and the physical device activity levels are equal.

At DA initialization the DMSP_TABLE is initialized as shown in FIG. 5A. Note, in this embodiment, that the DMSP_PDL is represented as four bytes (shown in hexadecimal), two bytes for each physical device. The first byte is the director number and the first nibble of the second byte is the interface or port number on that director. The second nibble is the TID on that interface or port. In other embodiments, the table can allow, for example, for more than 15 TIDS.

Once the time has arrived to execute the dynamic mirror service policy (DMSP), the master DA begins filling in the table of FIG. 5A with actual numbers. The table, with these numbers filled in, can look as illustrated in FIG. 5B.

The next step is sorting the table of FIG. 5B by activity level. It is assumed that equal weighting will be used for both reads and writes. The output of the sort is illustrated in FIG. 5C. The DMSP_DA_ACT_LVL and DMSP_PHYS_ACT_LVL tables are now initialized to zero (see FIGS. 5D and 5E).

Now, beginning with the first device in the DMSP_TABLE (a pointer will point to the logical volume with the highest activity level after the table is sorted), the method of the invention begins comparing activity levels to make a decision for a preferred device. Beginning with logical volume 9, the volume with the highest activity level, the method determines two comparison numbers for the decision about which physical device is preferred (between the two which can be chosen). The two device (and port) interface levels are illustrated in FIGS. 5F and 5G.

After determining these two levels, the DMSP_PREFERRED_DEV will be selected as device 0300 since it has a lower activity level. The DMSP_DA_ACT_LVL and DMSP_PHYS_ACT_LVL tables will be updated using the activity for this logical device as illustrated in FIGS. 5H and 5I.

Now the next device (Logical Volume 5) is processed. (See the pointer in FIG. 5D, in the now for logical volume 9.) Since the DMSP_PERCENT_SEQ is greater than 70% (the sequential threshold for this example), the method chooses an interleaved mirror service policy. The DMSP_PREFERRED_DEV is set to $FF and 50% of the logical volumes activity level is added to both DAs and Physical devices. This is illustrated in FIGS. 5J and 5K.

The next device (Logical Volume 6) is now processed as illustrated in FIGS. 5L and 5M. After determining the activity levels for these two devices, the DMSP_PREFERRED_DEV will be selected as device 0210 since it has a lower activity level. The DMSP_DA$_{13}$ACT_LVL and DMSP_PHYS_ACT_LVL tables are updated using the activity for this logical device as illustrated in FIGS. 5N and 5P.

Now, the next device (Logical Volume 4) is processed and the activity levels are determined. The results are illustrated in FIGS. 5Q and 5R. After determining these two levels, the DMSP_PREFERRED_DEV will be selected as device 0202 since it has a lower activity level. The DMSP_DA_ACT_LVL and DMSP_PHYS_ACT_LVL tables will be updated, using the activity for this logical device, as illustrated in FIGS. 5S and 5T.

Now, the next device (Logical Volume 3) is processed and the device activity levels are determined. The results are illustrated in FIGS. 5U and 5V. After determining these two activity levels, the DMSP_PREFERRED_DEV will be selected as device 0311 since it has the lower activity level. The DMSP_DA_ACT_LVL and DMSP_PHYS_ACT_LVL tables are again updated using the activity for this logical device, as illustrated in FIGS. 5W and 5X.

Now, the next device (Logical Volume 2) is processed and its device activity levels are determined as described above. The results are illustrated in FIGS. 5Y and 5Z. After determining these two device activity levels, the DMSP_PREFERRED_DEV will be selected as device 0201 since it has a lower activity level. The DMSP_DA_ACT_LVL and DMPS_PHYS_ACT_LVL tables are then updated using the activity for this logical device, as illustrated in FIGS. 5AA and 5AB.

Now the next device (Logical Volume 0) is processed and the device activity levels are determined as illustrated in FIGS. AC and AD. After determining these two levels, the DMSP_PREFERRED_DEV will be selected as device 0300 since it has the lower activity level. The DMSP_DA_ACT_LVL and DMSP_PHYS$_{13}$ACT_LVL tables are again updated using the activity levels for this logical device, as illustrated in FIGS. 5AE and 5AF.

Now the next device (Logical Volume 1) is processed and the device activity levels are determined. The results are illustrated in FIGS. 5AG and 5AH. After determining these two device activity levels, the DMSP_PREFERRED_DEV is selected as device 0310 since it has a lower activity level. The DMSP_DA_ACT_LVL and DMSP_PHYS_ACT_LVL tables are now updated using the activity levels for this logical device, as illustrated in FIGS. 5AI and 5AJ.

Now the next device (Logical Volume 7) is processed and its activity levels are determined as illustrated in FIGS. 5AK and 5AL. After determining these two levels, the DMSP_PREFERRED_DEV is selected as device 0301 since it has the lower activity level. The DMSP_DA_ACT_LVL and DMSP_PHYS_ACT_LVL tables are updated using the activity levels for this logical device, as illustrated in FIGS. 5AM and 5AN.

Now the final device (Logical Volume 8) in this example is processed. The resulting activity levels for the device are illustrated in FIG. 5AP and 5AQ. After determining these two activity levels, the DMSP_PREFERRED_DEV is selected as device 0211 since it has a lower activity level. The DMSP_DA_ACT_LVL and DMSP_PHYS_ACT_LVL tables are now updated using the activity levels for this logical device, as illustrated in FIGS. 5AR and 5AS.

After this process, the DMSP_TABLE looks as illustrated in FIG. 5AT. Now starting again at the beginning of the list, mirror service policies are first decided based on the per cent Sequential, (here using a value that anything over 70% requires an interleave mirror service policy), and the preferred device is selected. (Note, that in FIG. 5AT, the interleave policy is already entered, and that the interleave factor is set, at "Pref", equal to FF. The new policies will be entered in the DMSP_TABLE as illustrated in FIG. 5AU.

There are no instances where one of the physical devices is unused (corresponding to no count in the DMSP_PHYS_ACT_LVL table). If there had been an unused physical device, the first logical volume that was serviced by that physical volume would have had its mirror service policy changed to MIX ($C1).

At this point, the DA executing this process creates a GST queue entry with a message to all other DA's to begin polling the GST queue more frequently. Once all DA's have received this message, another message is sent to update the mirror service policy based on the new DMSP_TABLE (which was copied back to global memory after the completed execution).

Additions, subtractions, and other modifications of the preferred embodiments of the invention will be apparent to those practiced in this field and are within the scope of the following claims.

What is claimed is:

1. A method for dynamically adjusting the loading on operating physical drives in a system for reading from plural mirrored logical volumes comprising the steps of
    collecting statistics describing at least reading and writing data to said individual mirrored logical volumes during successive time periods,
    determining from said statistics a loading of said mirrored logical volumes and a measure of efficiency in accessing said mirrored logical volumes, and
    dynamically adjusting the access to said mirrored logical volumes to more evenly balance the loading of said volumes.

2. The method of claim 1 further comprising the step of
    periodically repeating the determining and adjusting steps for dynamically and periodically updating said logical volume loading.

3. The method of claim 2 further wherein said collecting step comprises the steps of
    collecting statistics describing, for each logical volume,
    the number of reads in a last time period,
    the number of writes in the last time period, and
    the percentage of input/output operations in the last time period that were sequential.

4. The method of claim 3 further wherein said adjusting step comprises the step of selecting an interleave mirror service policy whenever the percentage of sequential input/output operations in said last time period exceeds a selected threshold value.

5. The method of claim 4 wherein said threshold value is at least 60%.

6. The method of claim 3 wherein said determining step comprises the step of
    determining the activity level of a mirror pair of logical volumes by weighting, respectively, the number of reads and writes in the last time period.

7. The method of claim 6 further comprising the steps of
    determining, for each device controlling a said one of a mirrored logical volume, an activity level, and
    selecting the controlling device having the minimum activity level to control the mirrored logical volume.

8. The method of claim 7 further comprising the step of
    repeating the selecting step of claim 7, in order of decreasing activity level, for determining the controlling device for each mirrored logical volume pair.

9. The method of claim 1 wherein said adjusting step comprises the step of
    reviewing an initial mirror service policy decision for each mirrored logical volume pair for optimizing the seek time across the entire set of logical volumes.

10. An apparatus for dynamically adjusting the mirror service policy for a plurality of operating physical devices, each device controlled by one of a plurality of disk adapters comprising
    a stored computer program in magnetic memory instituting the steps of
        collecting statistics describing at least reading and writing data to said individual mirrored logical volumes during successive time periods,
        determining from said statistics a loading of said mirrored logical volumes and a measure of efficiency in accessing said mirrored logical volumes, and
        dynamically adjusting the access to said mirrored logical volumes to more evenly balance the loading of said volumes.

11. The apparatus of claim 10 further wherein said program institutes the step of
    periodically repeating the determining and adjusting steps for dynamically and periodically updating said logical volume loading.

12. The apparatus of claim 11 further wherein said program instituted collecting step comprises the step of
    collecting statistics describing, for each logical volume,
    the number of reads in a last time period,
    the number of writes in the last time period, and
    the percentage of input/output operations in the last time period that were sequential.

13. The apparatus of claim 12 further wherein said program instituted adjusting step comprises the step of
    selecting an interleave mirror service policy whenever the percentage of sequential input/output operations in said last time period exceeds a selected threshold value.

14. The apparatus of claim 13 wherein said threshold value is at least 60%.

15. The apparatus of claim 12 wherein said program instituted determining step comprises the step of
    determining the activity level of a mirror pair of logical volumes by weighting, respectively, the number of reads and writes in the last time period.

16. The apparatus of claim 15 further comprising the program instituted steps of
    determining, for each device controlling a said one of a mirrored logical volume, an activity level, and
    selecting the controlling device having the minimum activity level to control the mirrored logical volume.

17. The apparatus of claim 16 further comprising the instituted program step of
    repeating the selecting step of claim 16, in order of decreasing activity level, for determining the controlling device for each mirrored logical volume pair.

18. The apparatus of claim 10 wherein said program instituted adjusting step comprises the step of
    reviewing an initial mirror service policy decision for each mirrored logical volume pair for optimizing the seek time across the entire set of logical volumes.

19. An apparatus for dynamically adjusting the mirror service policy for a plurality of operating physical devices, each device controlled by one of a plurality of disk adapters comprising
    a stored computer program in magnetic memory instituting the steps of collecting statistics describing at least reading and writing data to said individual mirrored logical volumes during successive time periods, determining from said statistics a loading of said disk adapters based on said mirrored logical volumes, and dynamically adjusting the access to said mirrored logical volumes at least in part to more evenly balance the loading of said disk adapters.

20. The apparatus of claim 19 further wherein said mirrored logical volumes comprise groups of two logical volumes.

21. A method for dynamically adjusting the loading on operating physical drives in a system for reading from plural mirrored logical volumes comprising the steps of collecting statistics describing at least reading and writing data to said individual mirrored logical volumes during successive time periods, determining from said statistics a loading of said system based on reading and accessing said mirrored logical volumes, and dynamically adjusting the access to said mirrored logical volumes to more evenly balance the loading in reading and assessing of said volumes.

22. The method of claim 21 wherein said mirrored logical volumes comprise groups of two logical volumes.

* * * * *